United States Patent
Zhang et al.

(10) Patent No.: US 11,153,314 B2
(45) Date of Patent: Oct. 19, 2021

(54) TRANSACTION SEQUENCE PROCESSING WITH EMBEDDED REAL-TIME DECISION FEEDBACK

(71) Applicant: Visa International Service Application, San Francisco, CA (US)

(72) Inventors: Wei Zhang, Foster City, CA (US); Liang Wang, San Jose, CA (US); Robert Christensen, Foster City, CA (US); Yan Zheng, Foster City, CA (US); Liang Gou, Foster City, CA (US); Hao Yang, San Jose, CA (US)

(73) Assignee: Visa International Service Application, San Francisco, CA (US)

( * ) Notice: Subject to any disclaimer, the term of this patent is extended or adjusted under 35 U.S.C. 154(b) by 445 days.

(21) Appl. No.: 16/370,426

(22) Filed: Mar. 29, 2019

(65) Prior Publication Data

US 2020/0314101 A1    Oct. 1, 2020

(51) Int. Cl.
   *H04L 29/06* (2006.01)
   *G06N 3/08* (2006.01)

(52) U.S. Cl.
   CPC ............... *H04L 63/10* (2013.01); *G06N 3/08* (2013.01); *H04L 63/1433* (2013.01)

(58) Field of Classification Search
   CPC ....... H04L 63/10; H04L 63/1433; G06N 3/08; G06N 3/0454; G06N 3/0445; G06Q 20/4016; G06Q 20/405
   See application file for complete search history.

(56) References Cited

U.S. PATENT DOCUMENTS

| | | | |
|---|---|---|---|
| 6,658,393 B1 * | 12/2003 | Basch | G06Q 20/341 705/35 |
| 7,227,950 B2 | 6/2007 | Faith et al. | |
| 9,489,674 B2 | 11/2016 | Faith et al. | |

(Continued)

OTHER PUBLICATIONS

S. Siami-Namini, N. Tavakoli and A. S. Namin, "The Performance of LSTM and BiLSTM in Forecasting Time Series," 2019 IEEE International Conference on Big Data (Big Data), 2019, pp. 3285-3292, doi: 10.1109/BigData47090.2019.9005997. (Year: 2019).*

(Continued)

*Primary Examiner* — Chau Le
(74) *Attorney, Agent, or Firm* — Kilpatrick Townsend & Stockton LLP

(57) ABSTRACT

A system and method for scoring an interaction using an analytical model and authorization decisions is disclosed. The method includes receiving from an access device an authorization request message for an interaction between a user and a resource provider. An analytical model comprising a neural network with at least one long short-term memory determines a score based on data in the authorization request message. The analytical model was formed using interaction data from prior authorization request messages, and authorization response messages from an authorizing computer. The authorization request message and the score is transmitted to the authorizing computer and an authorization response message, including an indication of whether the interaction was approved or declined, is received. Then the analytical model is updated based upon data in the authorization request message and the indication in the authorization response message to form an updated analytical model.

20 Claims, 10 Drawing Sheets

(56) References Cited

U.S. PATENT DOCUMENTS

| | | | | |
|---|---|---|---|---|
| 9,501,773 B2* | 11/2016 | Dai | ......................... | G06F 21/64 |
| 10,489,755 B2* | 11/2019 | Tikku | ................... | G06Q 20/027 |
| 10,692,058 B2* | 6/2020 | Zoldi | ..................... | G06Q 20/10 |
| 2011/0066493 A1* | 3/2011 | Faith | .................. | G06Q 30/0251 |
| | | | | 705/14.49 |
| 2011/0112954 A1 | 5/2011 | Bruesewitz | | |
| 2014/0006284 A1* | 1/2014 | Faith | .................. | G06Q 20/4016 |
| | | | | 705/44 |
| 2019/0205977 A1* | 7/2019 | Way | ....................... | G06N 7/005 |
| 2020/0311231 A1* | 10/2020 | Levin | ................... | G06F 21/316 |

OTHER PUBLICATIONS

Hochreiter, S. and Schmidhuber, J., "Long short-term memory," *Neural Computation*, 9, 1997, pp. 1735-1780.

\* cited by examiner

TRANSACTION SEQUENCE PROCESSING WITH EMBEDDED REAL-TIME DECISION FEEDBACK

BACKGROUND

In some authorization processes, an authorization request passes through a processing computer before reaching an authorizing entity. The processing computer may perform preliminary or supplementary authorization of the request to perform a risk analysis. The information that the processing computer uses to perform the risk analysis may be limited in scope because it is limited to the information in its possession. Consequently, the risk analysis may not accurately reflect the decision that the authorizing entity might make.

Another challenge includes how to reduce the amount of data stored at the processing computer. The processing computer may receive millions of authorization requests and authorization decisions for various users at different times. The processing computer may store all of the authorization data associated with a user into memory and retrieve them at runtime to perform a risk analysis. However, this can consume a significant amount of data storage and computational resources. As the number of transactions that are conducted is ever increasing, continuing to add data storage and data processors is difficult and costly.

Embodiments of the invention address these and other problems individually and collectively.

BRIEF SUMMARY

One embodiment of the invention includes receiving, by a processing computer from an access device, an authorization request message for an interaction between a user and a resource provider. The method then includes determining, by an analytical model comprising a neural network with at least one long short-term memory on the processing computer, a score based upon data in the authorization request message, wherein the analytical model was formed using interaction data from prior authorization request messages, and authorization response messages from an authorizing computer. Then the processing computer transmits to the authorizing computer the authorization request message comprising the score and receives, by the processing computer, an authorization response message from the authorizing computer, the authorization response message including an indication of whether the interaction was approved or declined. The method then includes transmitting, by the processing computer, the authorization response message to the access device and updating the analytical model based upon data in the authorization request message and the indication in the authorization response message to form an updated analytical model.

Another embodiment of the invention includes a processing computer comprising a processor and a computer readable medium, coupled to the processor, for performing a method that includes receiving, from an access device, an authorization request message for an interaction between a user and a resource provider. The method then includes determining, by an analytical model comprising a neural network with at least one long short-term memory, a score based upon data in the authorization request message, wherein the analytical model was formed using interaction data from prior authorization request messages, and authorization response messages from an authorizing computer. Then the method includes transmitting, to the authorizing computer, the authorization request message comprising the score and receiving an authorization response message from the authorizing computer, the authorization response message including an indication of whether the interaction was approved or declined. Then the method includes transmitting the second authorization response message to the access device and updating the analytical model based upon data in the authorization request message and the indication in the authorization response message to form an updated analytical model.

Another embodiment of the invention includes generating, by an access device, an authorization request message comprising data about an interaction between a user and a resource provider and transmitting the authorization request to a processing computer. The method then includes receiving an authorization response message from the processing computer, wherein the authorization response message was generated based on at least a score from an analytical model, wherein the analytical model comprises a neural network with at least one long-short term memory and wherein the analytical model was formed using interaction data from prior authorization request messages and authorization response messages from an authorizing computer.

Further details regarding embodiments of the invention can be found in the Detailed Description and the Figures.

DETAILED DESCRIPTION

Figure 1:
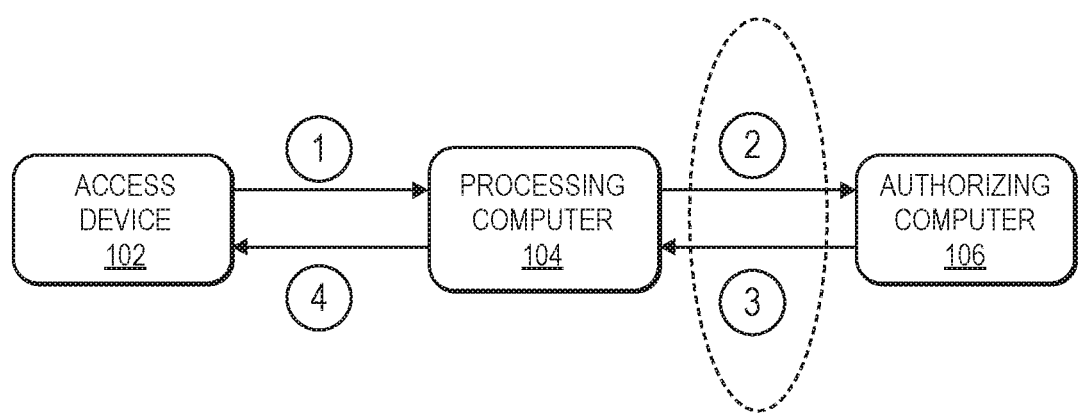
FIG. 1 shows a diagram of a system and a process flow according to embodiments.

Embodiments of the invention include a novel approach to incorporating authorization decisions from an authorizing computer into an analytical model residing at a processing computer. The analytical model can be a deep recurrent neural network (RNN) with long short-term memory (LSTM) where authorization decisions are embedded into the inner structure of the deep recurrent neural network. An LSTM is a unit of an RNN that can effectively retain information, including authorization decisions, over extended time scales. Authorization decisions for interactions may include approvals, denials, referrals, address verifications, and fraud flags. The analytical model can be trained using authorization decisions, which can be used as both inputs and auxiliary outputs during training, in addition to processing computer outputs such as fraud or non-fraud. In some embodiments, after the analytical model is deployed, it can generate processing computer outputs (e.g., fraud or non-fraud) based on authorization decisions without using the authorization decisions as direct inputs.

Embodiments of the invention address a number of challenges inherent in using authorization decisions. The LSTM can incorporate authorization decisions into the analytical model without having to store each authorization decision directly, which can save on memory and computational power. Because there is no need to recall each authorization decision at runtime, the analytical model can process data timely with the rate of interactions. Embodiments of the invention can also advantageously train the analytical model with authorization decisions. Authorization decisions from the authorizing computer may be available in the training data set, but not at runtime because an authorization decision is made only after a risk score from the processing computer is forwarded to the authorizing computer. In other words, authorization decisions can be used for analytical model training as "future" information, but they may not be used to produce a risk score at runtime because they may not be available. However, incorporating authorization decisions into an LSTM soon after receiving them allows the LSTM to make use of authorization decisions when analyzing new interactions.

Embodiments of the invention may also address challenges of response time. When the processing computer receives an authorization decision from the authorizing entity, the processing computer needs to process it quickly, so that it can analyze the next authorization request. Failing to do so may alter the order of interactions as they are processed by the processing computer, which may lead to inaccurate predictions. Additionally, a substantial delay in processing could negatively affect users.

Prior to discussing embodiments of the invention, some terms can be described in further detail.

A "user" may include an individual or a computational device. In some embodiments, a user may be associated with one or more personal accounts and/or devices. In some embodiments, the user may be a cardholder, account holder, or consumer.

A "resource provider" can be any suitable entity that provides resources (e.g., goods, services, access to secure data, access to locations, or the like). For example, a resource provider can be a merchant, a venue operator, a building owner, a governmental entity, etc. A "merchant" may typically be an entity that engages in transactions and can sell goods or services, or provide access to goods or services.

An "authorizing entity" may be an entity that authorizes a request, typically using an authorizing computer to do so. An authorizing entity may be an issuer, a governmental agency, a document repository, an access administrator, etc.

An "acquirer" may be a financial institution associated with a merchant. Acquirers typically provide merchants with a bank account, and in some cases, transaction accepting infrastructure. Generally, after a transaction has been authorized and as part of the settlement process, funds are transferred from the issuer to merchant's account at the acquirer. The acquirer may also communicate payment transaction status with the merchant. The acquirer may operate an acquirer computer, which may generically be a transport computer.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

A "payment processing network" may be a network that processes payments. In some embodiments, a payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

An "authorization request message" may be a message that is sent to request authorization for an interaction. An authorization request message may be sent, for example to a secure data server, a payment processing network, an issuer of a payment card, a processing gateway, etc. An authorization request message may also comprise additional data elements corresponding to "identification information" including, for example, a service code, a user identifier, a CVV (card verification value), an expiration date, etc. An authorization request message may also comprise "interaction data," such as any information associated with a current interaction, such as an interaction value, a time stamp, resource provider identifier, resource provider location, etc., as well as any other information that may be utilized in determining whether to authorize an interaction. An authorization request message according to some embodiments may comply with ISO 8583, which is a standard for systems that exchange electronic transaction information associated with a payment made by a user using a payment device or payment account.

An "authorization response message" may be a message reply to an authorization request message. The authorization response message may be generated, for example, by a secure data server, an issuing financial institution, a payment processing network, a processing gateway, etc. The authorization response message may include, for example, one or more of the following status indicators: Approval—interaction was approved; Decline—interaction was not approved; or Call Center—response pending more information, resource provider must call the toll-free authorization phone number. The authorization response message may also include an authorization code, which may be a code that an authorizing entity returns in response to an authorization request message in an electronic message to the resource provider's access device that indicates approval of the transaction. The code may serve as proof of authorization.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "label" may be an output of a machine learning model. A label may be a numerical value, in particular a probability, or a classification. For example, labels may be fraud, non-fraud, spam, non-spam, dog, and cat. Labels may be output as a probability, such as 95% spam and 5% non-spam.

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors into multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

A "deep neural network (DNN)" may be a neural network in which there are multiple layers between an input and an output. Each layer of the deep neural network may represent a mathematical manipulation used to turn the input into the output. In particular, a "recurrent neural network (RNN)" may be a deep neural network in which data can move forward and backward between layers of the neural network.

A "long short-term memory (LSTM)" may be a unit of a recurrent neural network. An LSTM may be comprised of a cell and gates that control the flow information into and out of the cell.

An "analytical model" may be a computer model that can analyze data. An analytical model may be a machine learning model, such as a neural network. An analytical model may be trained or built based on a set of training data. Analytical models may be used to analyze, for example, authorization requests, meteorological data, and financial trends.

An "updated analytical model" may be an analytical model that has had new data added to it. The analytical model may be updated into an updated analytical model by adding new data without completely retraining the analytical model.

A "precursor analytical model" may be an analytical model before new data has been added to it. The precursor analytical model may be updated into an analytical model by adding new data without completely retraining the precursor analytical model.

A "cell state" may be a vector that stores information over extended time periods in a long short-term memory (LSTM). The cell state may be modified at each time step by the LSTM to add or remove information from the cell state. The cell state may be maintained in the LSTM over many time steps.

A "hidden state" may be a vector that stores information over short time periods in a long short-term memory (LSTM). The hidden state may transfer information from an LSTM at one time step to the LSTM at a subsequent time step. The hidden state may also transfer information from an LSTM at one time step to another LSTM at the same time step.

FIG. 1 shows a system 100 comprising a number of components according to embodiments. The system 100 may comprise an access device 102, a processing computer 104, and an authorizing computer 106. The components of the system 100 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The access device 102 may be a device configured to manage access to a particular resource. For example, the access device may be a laptop or a point of sale (POS) terminal. In some embodiments, the access device 102 may be in communication with another transport computer. The transport computer for example may be a resource provider computer or an acquirer computer.

The processing computer 104 may be a server computer. In some embodiments the processing computer 104 may be part of a payment processing network. In other embodiments the processing computer 104 may be part of an access gateway. The processing computer 104 may process authorization requests from the access device 102 using an analytical model. For example, the processing computer 104 may use the analytical model to predict if the authorization request is fraudulent.

The authorizing computer 106 may be configured to authorize any suitable request, including access to data, access to a location, or approval for a payment. The authorizing computer 106 may receive authorization request messages and return authorization response messages. In some embodiments, the authorizing computer 106 may be operated by an issuer. Typically, the issuer is an entity (e.g., a bank) that issues and maintains an account of a user. The account may be a credit, debit, prepaid, or any other type of account. In other embodiments, the authorizing computer 106 may be a secure data server.

Several embodiments of the invention may be described with reference to FIG. 1. In one embodiment, the access device 102 may be a laptop, the processing computer 104 may be an access gateway, and the authorizing computer 106 may be a secure data server.

In step 1, a user may use the access device 102 to access a website to log on to a secure data server. The user may enter access data, including access credentials such as a password or biometric information. The access device 102 may additionally protect the access data, for example, by encrypting or hashing the access credentials. The access device 102 may then generate an authorization request message. The authorization request message may comprise the access data and the access credentials. The authorization request message may also comprise interaction data such as an identifier of the data being requested, a timestamp of the request, a device identifier of the access device 102, etc. The access device 102 may then send the authorization request message to the processing computer 104.

In step 2, the processing computer 104 can receive the authorization request message from the access device 102. The processing computer 104 can process the authorization request message and analyze the interaction data. Processing computer 104 may then use an analytical model to generate a risk score. For example, if the device identifier matches a device identifier in previous authorization requests from the user, the processing computer 104 may determine a lower risk score for the authorization request message. As another example, if the authorization request message was sent at an uncharacteristic time (e.g., late at night), the processing computer 104 may determine a higher risk score for the authorization request message. In some cases, the processing computer 104 may not have access to all of the access data in the authorization request message. For example, the processing computer 104 may not be able to decrypt an encrypted password.

After determining a risk score, the processing computer 104 may add the risk score to the authorization request message. If the processing computer 104 determines that the risk score is too high, the processing computer 104 may not send the authorization request message to the authorizing computer 106 and may instead send a failure message or decline to the access device 102. The authorization request message may also comprise information explaining how the risk score was generated. The authorization request message can then be forwarded to the authorizing computer 106.

In step 3, the authorizing computer 106 may process the authorization request message from the processing computer 104. The authorizing computer 106 may process access data in the authorization request message. For example, the authorizing computer 106 may decrypt the password and compare the decrypted password to a stored password of the user. The authorizing computer 106 may have other information about the user and the authorization request message. For example, the authorizing computer 106 may have access to a profile of the user. The authorizing computer 106 may also use the risk score from the processing computer 104. Based on the information, the authorizing computer 106 may generate an authorization decision indicating whether the authorization request message is approved, denied, or whether further action is requested. The authorizing computer 106 may then generate an authorization response message comprising the authorization decision and may send the authorization response message to the processing computer 104.

In step 4, the processing computer 104 may send the authorization response message to the access device 102. If the authorization response message includes an authorization decision indicating that the authorization request message is approved, the processing computer 104 may allow the user access to the secure data server. Based on the authorization response message, the access device 102 may present the user with an indication that access is approved or denied.

In another embodiment, the access device 102 may be a POS terminal, the processing computer 104 may be a payment processing network (e.g., Visa), and the authorizing computer 106 may be an issuer computer.

In step 1, a user may use the access device 102 to initiate a transaction with a resource provider, and the user may input payment credentials into the access device 102. The access device 102 may send an authorization request message for the transaction to the processing computer 104. The access device 102 may send the authorization request message through a transport computer (not shown) such as one operated by an acquirer. The authorization request message may comprise transaction data such as payment credentials, a transaction amount, a resource provider identifier, and a time stamp of the transaction.

In step 2, the processing computer 104 can receive the authorization request message from the access device 102. The processing computer 104 can process the authorization request message and analyze the interaction data. Processing computer 104 may then use an analytical model to generate a risk score. The processing computer 104 may not have access to all of the transaction data in the authorization request message. For example, the processing computer 104 may not have access to encrypted payment credentials. After determining a risk score, the processing computer 104 may add the risk score to the authorization request message. If the processing computer 104 determines that the risk score is too high, the processing computer 104 may not send the authorization request message to the authorizing computer 106 and may instead send a failure message to the access device 102. The authorization request message may also comprise information explaining how the risk score was generated. The authorization request message can then be forwarded to the authorizing computer 106.

In step 3, the authorizing computer 106 may further process the transaction based on the risk score from the processing computer 104 and additional information stored in its own database. The additional information may not be available to the processing computer 104. For instance, additional information may include the user's social security number, home address, phone number, credit lines, loan payment history, etc. The authorizing computer 106 may also have its own operational teams consisting of experts with broad domain knowledge and experience. They may be able to investigate transactions in depth by contacting users and doing other background and security checks. The operational teams may incorporate their domain knowledge into predictive risk models or rules to assess the riskiness of the requested transaction, determining an indication of whether the transaction should be approved or declined. The authorizing computer 106 may then generate an authorization response message comprising the indication and transmit the authorization response message to the processing computer 104.

In step 4, the processing computer 104 can relay the authorization response message to the access device 102. The processing computer 104 may send the authorization response message through the acquirer. Based on the authorization response message, the access device 102 may present the user with an indication that the transaction is approved or denied. If the authorization response message includes an authorization decision indicating that the transaction is approved, the access device 102 may complete the transaction.

Further description of embodiments may focus on the payment transaction flow, but the concepts may equally apply to a data access system, or any other appropriate system.

Augmented with additional information and expertise on its own, along with information from the authorization request message provided by the processing computer, the authorizing computer is able to provide a more accurate decision on whether or not a authorization request should be approved or declined. After the authorization decision is sent back to the processing computer, embodiments of the invention can allow the processing computer to incorporate the authorization decision into an analytical model to enhance the accuracy for the subsequent transactions. More specifically, the authorization decisions may be used in two places simultaneously, serving as output labels and as input features.

Figure 2A:
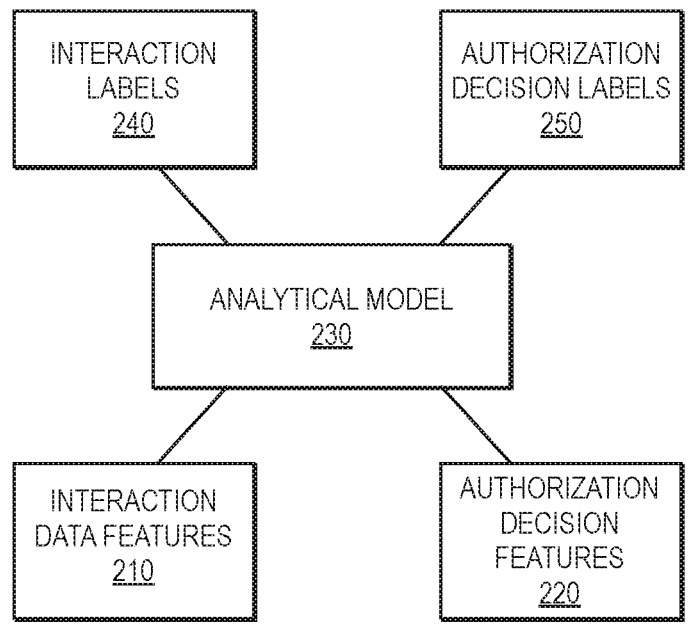
FIG. 2A and FIG. 2B show diagrams of analytical models and ancillary data according to embodiments.
Figure 2B:
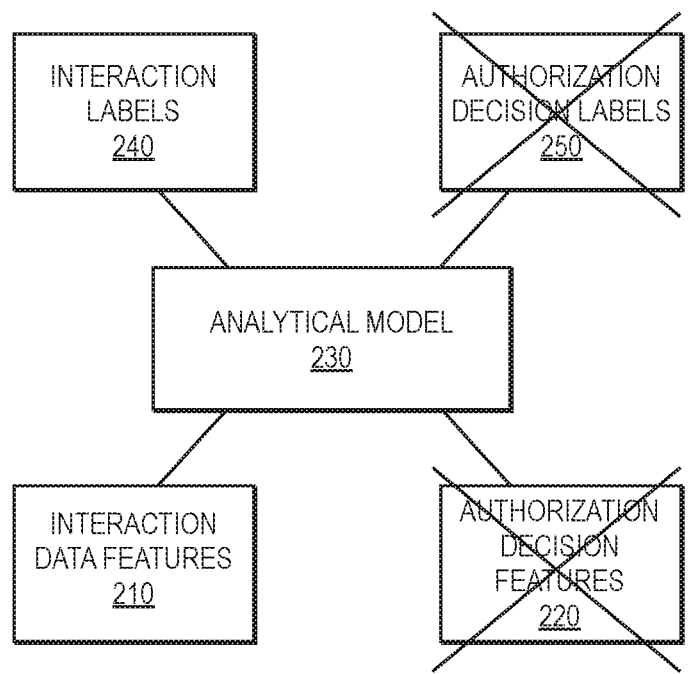

A block diagram of an analytical model according to embodiments is shown in FIG. 2A and FIG. 2B. These figures can illustrate the use of authorization decisions as both output labels and input features.

FIG. 2A shows an analytical model during training. During training, interaction data features 210, i.e. features derived from interaction data available to the processing computer, and authorization decision features 220, i.e. features derived from authorization decisions, may be used as inputs for the analytical model 230. Interaction data features 210 may include an interaction value, a time stamp, an interaction location, etc. Authorization decision features 220 may include reason codes and indicators of approval or denial. Interaction data features 210 and authorization decision features 220 may be extracted from a set of training data. For example, the training data may be the interaction history of a user, including authorization responses from an issuer for each transaction. The training data may also include output labels, including an interaction label 240 comprising a risk score or risk label for each interaction, and an authorization decision label 250 comprising the authorization decision. Together, the interaction labels and authorization decision labels may be called risk labels. The labels in the training data may be the desired outputs of the analytical model 230. The loss of a particular label may be computed as the difference between the output labels of the analytical model 230 during training and the desired output. During training, the learning algorithm can aim to minimize the loss on interaction labels 240 (e.g., fraud, non-fraud) while also minimizing loss on authorization decision labels 250 (e.g., decline, address verification).

FIG. 2B shows the analytical model 230 after it is deployed. When analyzing new interactions, only the interaction data features 210 may be available and not the authorization decision features 220, as an authorization decision for the interaction may not have been received yet. The analytical model 230 may generate interaction labels 240 for the given interaction, partially based on what a predicted authorization decision will be. For example, the interaction label 240 may be "non-fraud" if the analytical model predicts that an authorizing entity will approve the interaction. However, the analytical model may not predict an authorization decision label 250. While authorization decision features 220 may not be used for generating an interaction label 240 or an authorization decision label 250 for the current interaction, the authorization decision features 220 may still be used to update the analytical model 230, which can be immediately available to analyze the next interaction. Therefore, authorization decisions can not only be used during training but may also be stored and updated at runtime. This may be done in real time, or substantially close to real time.

Interaction label 240 and authorization decision label 250 may be referred to collectively as risk labels. In some embodiments, the risk labels may correspond to reason codes used in authorization decisions. For example, risk labels may include "0" for a legitimate interaction, "1" for a fraudulent interaction, "2" for a declined interaction with a reason code "05" (do not honor), "3" for address verification, "4" for a declined interaction with a type different from the reason code "05" (e.g., referral, pick up card), and "5" if a reason code is not available. In this example, the risk labels "0" and "1" may be possible interaction labels 240, and the risk labels "2", "3", "4", and "5" may be possible authorization decision labels 250. The risk labels may be based on or related to a risk score. The risk score can be the probability that an interaction is likely to be fraudulent. For example, the risk score may be a value between 0 and 1. A risk score value of close to 1 may indicate that the interaction has a very high likelihood being fraudulent. Because the analytical model may determine a classification for each interaction, the analytical model may be considered a machine learning classifier.

An analytical model according to embodiments may be a deep recurrent neural network (RNN) with long short-term memory (LSTM) (Hochreiter, S. and Schmidhuber, J., Long short-term memory, *Neural Computation,* 9, 1997, pp. 1735-1780). An LSTM is a unit, or cell, of an RNN that may comprise several neural network layers and mathematical operations. An LSTM maintains a cell state vector c(t) and a hidden state vector h(t), which together can act as a memory for past information. The cell state vector c(t) can store information over longer periods of time, while the hidden state vector h(t) can store information for shorter periods of time. In particular, the cell state vector c(t) may store information for many time steps (e.g., more than 1000), while the hidden state vector h(t) may store information for only a few time steps. At each time step, the LSTM can reset or modify the state vectors and choose to expose or suppress communication of their contents using filtering mechanisms. For example, an LSTM can process authorization decisions, along with a user's interaction sequence, one interaction at a time and decide what to add to memory and what to remove from memory.

Figure 3:
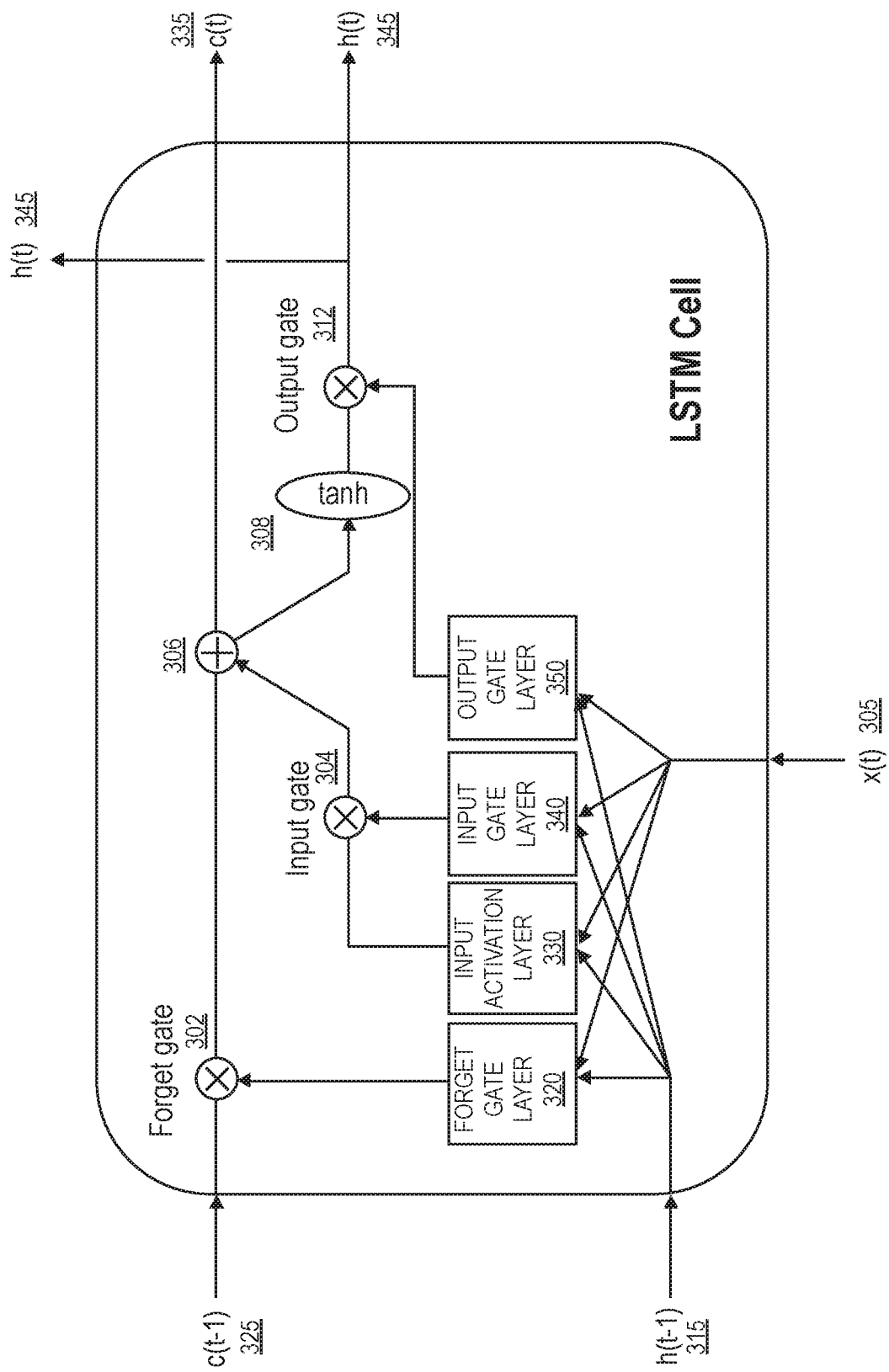
FIG. 3 shows a diagram of an LSTM cell according to embodiments.

An example LSTM cell is shown in FIG. 3. The inputs to an LSTM cell at time t include an input vector x(t) 305, and the cell state c(t-1) 325 and the hidden state h(t-1) 315 of the LSTM cell at the previous time step t-1. The input vector x(t) 305 may comprise interaction data features (e.g., interaction value, time stamp) and/or authorization decision features (e.g., reason codes). The input vector x(t) 305 and the hidden state h(t-1) 315 can be concatenated together, so that information about the present (via the input vector x(t) 305) and the recent past (via the hidden state h(t-1) 315) can be analyzed together. The two vectors can then pass through a forget gate 302, an input gate 304, and an output gate 312 to determine how to update the cell state c(t-1) 325 and what information to output.

The forget gate 302 can control what information is removed from the cell state c(t-1) 325. The combination of the input vector x(t) 305 and the hidden state h(t-1) 315 can pass through a forget gate layer 320. The forget gate layer 320 may be a sigmoid neural network layer associated with the forget gate 302. The forget gate layer 320 can determine, based on the new information that is entering the cell, what information to remove from the cell state c(t-1) 325. For example, if the input vector x(t) 305 indicates that a user has recently reset their access credentials, the forget gate layer 320 may decide to forget information about fraudulent activity associated with older access credentials. Because the forget gate layer 320 is a neural network layer, it can learn over time when it is appropriate to remove information from the cell state c(t-1) 325. As a sigmoid function, the forget gate layer 320 can output a value between 0 and 1 for each piece of information in the cell state c(t-1) 325. 0 may correspond to completely removing the information, 1 may correspond to keeping the information unchanged, and intermediate values may correspond to assigning less importance to existing information. For example, an output value of 0.5 may cause the cell state c(t-1) 325 to gradually forget about past fraudulent activity over several time steps.

The output of the forget gate layer 320 may be thought of as instructions for the forget gate 302. The forget gate 302 itself may be a pointwise multiplication between the cell state c(t-1) 325 and the instructions from the forget gate layer 320. For example, multiplying a piece of information in the cell state c(t-1) 325 by 0 will set that piece of information to 0, effectively removing it from the cell state c(t-1) 325.

The input gate 304 can control what new information is added to the cell state c(t-1) 325. The input gate 304 may also have an input gate layer 340 which operates similarly to the forget gate layer 320. The input gate layer 340 may be a sigmoid neural network layer which determines what information from the input vector x(t) 305 and the hidden state h(t-1) 315 should be input to the cell state c(t-1) 325. The input gate layer 340 may output 0 for information that should not be added to the cell state c(t-1) 325, 1 for information that should be added, and an intermediate value for information that should be added with less importance. For example, the input gate layer may output a 1 for the information that the user has new access credentials, indicating that it is an important piece of information.

The input vector x(t) 305 and the hidden state h(t-1) 315 may also pass through an input activation layer 330 that is a tanh neural network layer. The input activation layer 330 may use the tanh function to transform the inputs to values between -1 and 1. The information in the cell state c(t-1) 325 and the hidden state h(t-1) 315 may be within the range of -1 to 1 already, thus in order to meaningfully add new information to the cell state c(t-1) 325, the input can be scaled to that range as well. Other embodiments may use a different activation function to scale the inputs. The input gate 304 may be a pointwise multiplication of the output of the input activation layer 330 and the output of the input gate layer 340, which results in a vector of information that should be added to the cell state c(t-1) 325. A pointwise addition operation 306 can add this vector of information from the input gate 304 to the cell state c(t-1) 325. The cell state c(t-1) 325 is thus updated to an updated cell state c(t) 335 by removing information with the forget gate 302 and adding information with the input gate 304. At the next time step t+1, the updated cell state c(t) 335 can be updated again with new information.

The LSTM cell can then determine the information to output from the LSTM cell using the output gate 312. The input vector x(t) 305 and the hidden state h(t-1) 315 can pass through an output gate layer 350 that may operate similarly to the forget gate layer 320 and the input gate layer 340. The output gate layer 350 may be a sigmoid neural network layer that determines what information to output. The output gate layer 350 may output 0 for information that should not be output, 1 for information that should be output, and intermediate values for information that should be output with less importance. For example, the output gate layer 350 may output a 1 for the information that the user has new access credentials.

The updated cell state c(t) 335 can pass through a pointwise tanh function 308 to transform the values of the updated cell state c(t) 335 between −1 and 1. As with the input activation layer 330, this may be to ensure that the output is scaled correctly. The output gate 312 may perform a pointwise multiplication of the tanh function 308 and the output of the output gate layer 350 to generate an updated hidden vector h(t) 345. In other embodiments, the operation of the tanh function 308 may correspond to the activation function of the input activation layer 330. The updated hidden vector h(t) 345 and the updated cell vector c(t) 335 can then be used by the LSTM cell at the next time step t+1. The updated hidden vector h(t) 345 may also be output from the LSTM cell, and may be sent to another LSTM cell or a neural network layer.

FIG. 3 depicts a simple example of an LSTM that may be used in embodiments of the invention. Other embodiments may use more complicated LSTM cells with additional features. For example, the output gate layer 350 may receive information from the cell state c(t−1) 325 and/or the updated cell state c(t) 335 in addition to the input x(t) 305 and the hidden state h(t−1) 315 when determining what information to output.

Mathematically, in a general LSTM, the state vectors c(t) and h(t) at time step t can be concatenated into (c(t), h(t)) which can be updated based on state vectors for the previous time step t−1, c(t−1) and h(t−1), as well as a current input vector x(t):

$$(c(t),h(t))=\text{LSTM}(c(t-1),h(t-1),x(t)) \quad \text{(Equation 1)}$$

In Equation (1), the current input vector x(t) may consist of interaction data features created from interaction information (e.g., user identifier, resource provider identifier) and authorization decision features created from authorization response messages (e.g., authorization decision, reason code).

The final prediction from the analytical model can be calculated from the hidden state h(t) by $$\hat{y}(t)=\text{softmax}(Wh(t)+b) \quad \text{(Equation 2)}$$

where W is a weight matrix and b is a bias vector. Both W and b can be learnable parameter arrays. In some embodiments, where there are more than two possible categories for the prediction (e.g., four authorization decision labels, six risk labels), a softmax function may be used to convert the hidden state h(t) into probabilities for each potential label. If there are only two possible categories for the prediction, other activation functions may be used to convert the hidden state h(t) into probabilities, such as a sigmoid function.

The accuracy of the analytical model in classifying an interaction may be quantified as classification loss. Classification loss can measure how different the output of the model is from the expected or actual value. Classification loss can be calculated using cross-entropy, which sets the loss for predictions for N training examples over K classes as:

$$\mathcal{L}(\hat{y}(1),\hat{y}(2)\ldots\hat{y}(N))=-\frac{1}{N}\sum_{i=1}^{N}\sum_{j=1}^{K}y(i,j)\log\hat{y}(i,j) \quad \text{(Equation 3)}$$

Where ŷ(i,j) is the probability that the analytical model predicts for interaction i being in class j, and y(i, j) is the actual classification of the interaction. For example, ŷ(100, 1)=0.05 may be the probability output by the analytical model of interaction 100 being fraud and ŷ(100,2)=0.95 may be the probability of interaction 100 as being non-fraud. y(100,1)=0 and y(100,2)=1 may indicate that the interaction is not fraud. Summing the cross-entropy for all possible classifications of all interactions in the training data (divided by the total number of interactions) gives the classification loss. During training, the analytical model may adjust weights to minimize classification loss. $L_2$ regularization may be applied when optimizing the classification loss function of Equation 3

LSTM can facilitate long-term storage of authorization response data and may obviate the need for physically preserving a memory for authorization decisions and a user's historic interactions. An LSTM may also handle variable length interaction sequences. An advantage of LSTM over traditional risk detection models is that an LSTM may be able to learn and selectively retain relevant information, allowing the LSTM to capture dependencies across long time steps. This can be done through controlling a forget gate inside an LSTM cell. If an LSTM decides to remember information, it can open the gate by setting the forget gate output value as 1 or close to 1; if an LSTM wants to forget or discount information, it will close the gate by setting the forget gate output value as 0 or close to 0. This allows the LSTM to utilize both current input and past information while making future predictions. This can learned by the analytical model automatically without knowledge of time dependencies in data.

Figure 4:
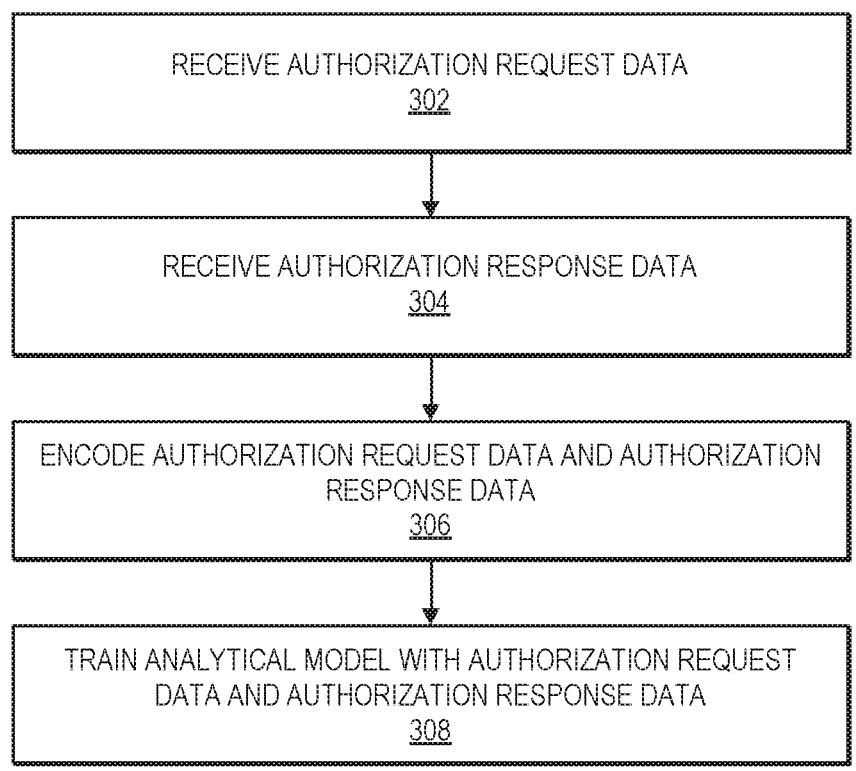
FIG. 4 shows a flowchart illustrating a method of model training according to embodiments.

FIG. 4 shows a flow chart of training an analytical model according to embodiments. The analytical model may be formed and trained using interaction data from prior authorization request messages and prior authorization response messages from an authorizing computer The analytical model may be run on a processing computer such as processing computer 104 in FIG. 1.

In step 302, the processing computer can receive prior authorization request data from a plurality of past interactions. The prior authorization request data may form part of a training dataset. The prior authorization request data may have been collected by the processing computer over a period of time. For example, the prior authorization request data may be derived from interaction histories of a plurality of users from the past year. The prior authorization request data may comprise for example, transaction values, times of the authorization requests, the identity of users involved in the authorization requests, etc.

In step 304, the processing computer can receive authorization response data. The authorization response data may be collected by the processing computer from authorization response messages from an authorizing computer. The authorization response data may form part of the training dataset. The authorization decisions may be associated with the past interactions of the authorization request data. The authorization response data may comprise indications such as authorization decisions (e.g., approved, declined, address request, etc).

In step 306, the processing computer can input the authorization request data as interaction data features and the authorization response data as authorization decision features to the analytical model. The analytical model can encode the interaction data features and the authorization decision features as embedding vectors. For example, the interaction data features may be [$20, 1 PM, Target, e-commerce]. The analytical model may encode that information as [20, 13, 5, 3] where 13 represents the time stamp in hours, 5 represents a resource provider identifier (e.g., Target is $5^{th}$ on a list or resource providers), and 3 represents an interaction type (e.g., e-commerce is $3^{rd}$ on a list of interaction types). Other embedding schemes may be used in embodiments. The processing computer can input interaction labels from the interactions. The processing computer may also input authorization decision labels generated from the authorization response data. Collectively, the interaction labels and the authorization decision labels may comprise risk labels. The risk labels may also be associated with a risk score from the processing computer.

In step 308, the analytical model may analyze the interaction data features and the authorization decision features. The analytical model may analyze the training data associated with each user. As the analytical model processes the training data, LSTM in the analytical model can update a cell state and a hidden state. For each interaction in the training data that the analytical model processes, it may output a predicted interaction label and a predicted authorization decision label. The output may be risk score and/or a risk label. The analytical model may then calculate classification loss by comparing the predicted interaction label to the actual interaction label and comparing the predicted authorization label to the actual interaction label. The analytical model can recursively process the training data to minimize the classification loss. When training the analytical model, dropouts may be applied in each LSTM, with a dropout probability of 0.5.

Figure 5:
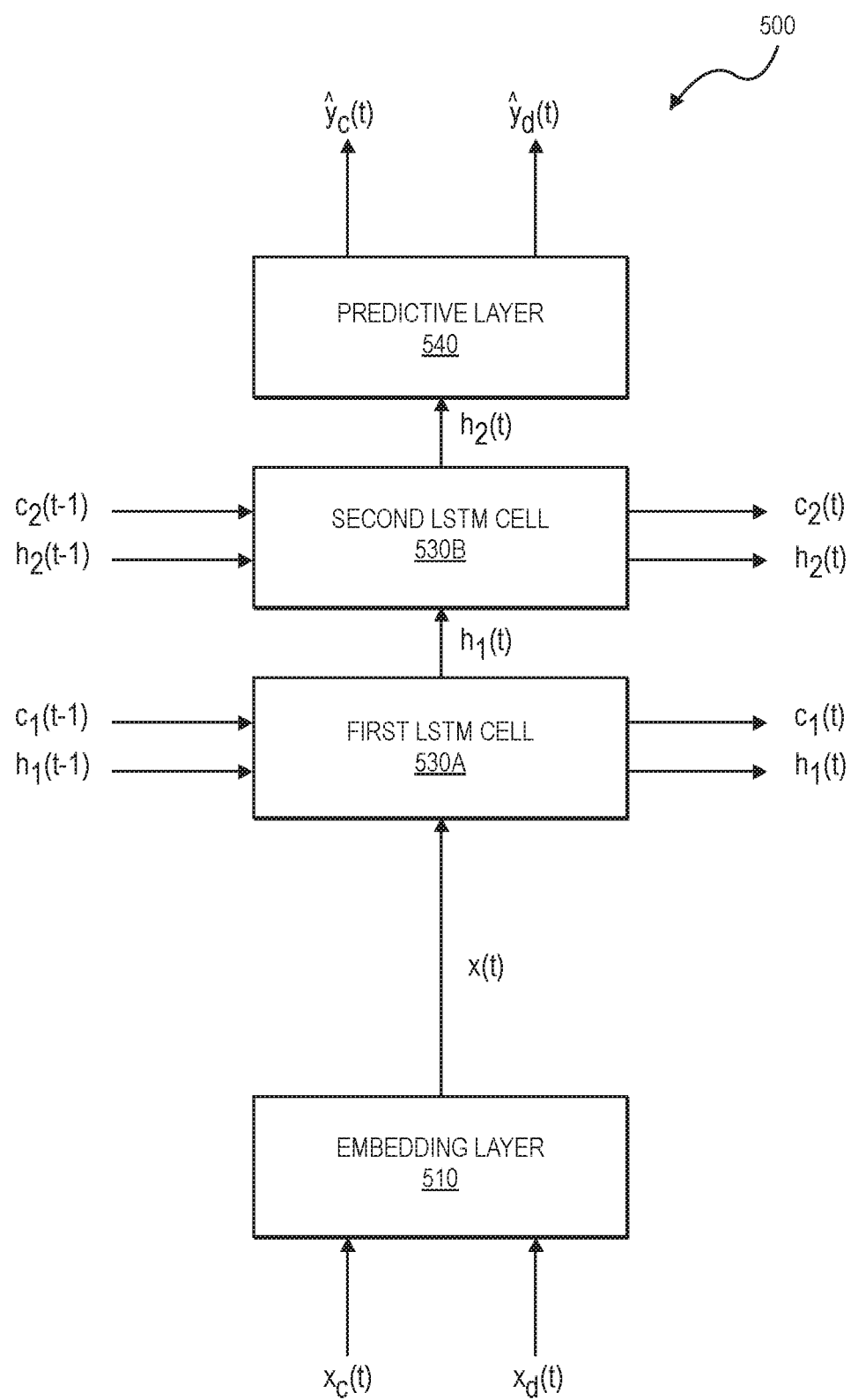
FIG. 5 shows an architecture diagram of an analytical model with two LSTM cells according to embodiments.

FIG. 5 shows a block diagram of an analytical model 500 according to embodiments. The analytical model may be a deep recurrent neural network (RNN). The analytical model 500 may comprise an embedding layer 510, one or more LSTM cells 530A and 530B, and a predictive layer 540. At time t, one input $x_c(t)$ may be interaction data features such as interaction values, a timestamp, an interaction location, and an interaction type. For example, $x_c(t)$ may be a vector including [$20, 1 PM, Target, e-commerce]. Another input $x_d(t)$ may be authorization decision features based on authorization decisions, such as an approval or a decline and reason codes. For example, $x_d(t)$ may be a vector including [declined, 05], where "05" is a particular reason code. One output $\hat{y}_c(t)$ may be an interaction label, which may include a security risk score. For example, $\hat{y}_c(t)$ may be a vector [0.95, 0.05] with probabilities of an interaction being fraud and non-fraud, respectively. In some embodiments, there may be more than two potential interaction labels. Another output $\hat{y}_d(t)$ may be an authorization decision label, which may also be based on authorization decisions, like the authorization decision features. However, there may be more authorization decision features than authorization decision labels. FIG. 5 depicts an analytical model with two LSTM cells, however embodiments of the invention may have more or fewer LSTM cells.

The inputs $x_c(t)$ and $x_d(t)$ may be received by the embedding layer 510. The embedding layer 510 may encode the inputs. For example, $x_c(t)$ may be encoded as [20, 13, 5, 3] where 13 represents the timestamp in hours, 5 represents a resource provider identifier (e.g., Target is $5^{th}$ on a list of resource providers), and 3 represents an interaction type (e.g., e-commerce is $3^{rd}$ on a list of interaction types). During training, the embedding layer 510 may receive both interaction features $x_c(t)$ and authorization decision features $x_d(t)$. During production, the embedding layer 510 may only receive interaction features $x_c(t)$, as the authorization decision features $x_d(t)$ may not yet be available when analyzing a new interaction. The embedding layer 510 may then send the encoded inputs as an input vector x(t) to a first LSTM cell 530A.

The first LSTM cell 530A may receive the input data x(t). The first LSTM cell 530A may maintain a cell state $c_1(t)$ and a hidden state $h_1(t)$ for each user in the network. The cell state c(t) may be a vector that stores information about a user's interactions over a long time scale (i.e., a long period of time) and the hidden state h(t) may be a vector that stores information about the user's interactions over a short time scale (i.e., a short period of time). The first LSTM cell 530A may update a cell state $c_1(t-1)$ and a hidden state $h_1(t-1)$ from a previous time step with the new input data x(t) using the method described with reference to FIG. 3. Each LSTM cell 530 may also have network weights that are common across all users. For example, the weights to determine what new information to add to the cell state $c_1(t)$ of each user may be the same across all users. Each LSTM cell 530 may comprise 256 hidden nodes. The first LSTM cell 530A may output the hidden state $h_1(t)$ and send it to a second LSTM cell 530B.

The second LSTM cell 530B may receive the hidden state $h_1(t)$ of the first LSTM cell 530A and may use it as an input vector. The second LSTM cell 530B may also maintain a cell state $c_2(t)$ and a hidden state $h_2(t)$ for each user in the network. The second LSTM cell 530B may update a cell state $c_2(t-1)$ and a hidden state $h_2(t-1)$ from a previous time step with the hidden state $h_1(t)$ of the first LSTM cell 530A using the method described with reference to FIG. 3. The second LSTM cell 530B may output the hidden state $h_2(t)$ and send it to a predictive layer 540. Because the second LSTM cell 530B is processing data that has already been processed by the first LSTM cell 530A, the second LSTM cell 530B may analyze the data at a higher level of abstraction. Adding additional LSTM cells before the predictive layer 540 may allow the analytical model to discover more complex dependencies in the interaction data. However, additional LSTM cells also introduce a risk of overfitting.

The predictive layer 540 may receive the hidden state $h_2(t)$ of the second LSTM cell 530B. The predictive layer 540 may comprise a softmax function. The softmax function in the predictive layer 540 may convert the values in the hidden state $h_2(t)$ into a probability that the interaction is a particular output. For example, the predictive layer 540 may output a probability that an interaction is fraudulent. The predictive layer 540 may output a value for each possible output. For example, the analytical model may be configured to classify an interaction in one of six categories or risk labels: 0 for a normal interaction, 1 for a fraudulent interaction. 2 for a declined interaction (corresponding to an authorization decision of "do not honor"), 3 for an address verification, 4 for a declined interaction (not corresponding to an authorization code of "do not honor"), and 5 for an interaction where a response code is not available. If only two categories are considered (e.g., fraud and non-fraud) then the predictive layer 540 may comprise a sigmoid function, or another suitable activation function. The predictive layer 540 may also output a risk score for the interaction. The risk score and/or risk labels may be further divided into interaction labels $\hat{y}_c(t)$, which may be associated with decisions made by a processing computer, and authorization decision labels $\hat{y}_d(t)$, which may be predictions of other authorization decision information from an authorizing computer about the interaction. During training, the outputs from the predictive layer 540 can be compared to the expected outputs until the error between the generated output and the expected output is minimized.

Figure 6:
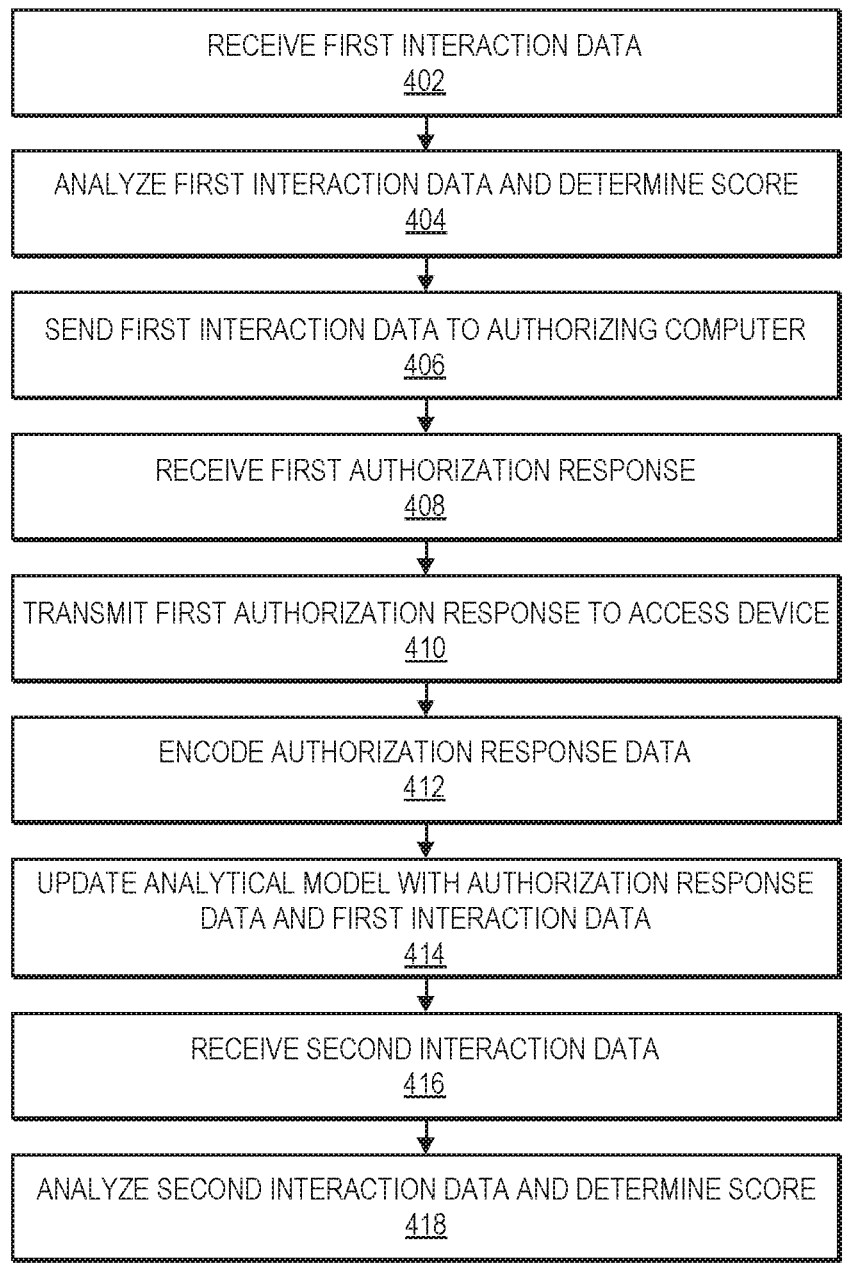
FIG. 6 shows a flowchart illustrating a method according to embodiments.

FIG. 6 shows a flow diagram of the analytical model being used to analyze authorization request messages. The analytical model may be run on a processing computer such as processing computer 104 in FIG. 1. The analytical model may have been trained by the method of FIG. 4. Each authorization request message may comprise interaction data that is readable by the processing computer. There may also be information in the authorization request that is not readable by the processing computer, such as encrypted credentials or other access data. The analytical model may have been a precursor analytical model before it was updated to the current analytical model with authorization response data from a prior authorization response message.

In step 402, the analytical model may receive first interaction data, corresponding to a first authorization request message, as interaction features. The first authorization request message may have been received by the processing computer for a first interaction between a user and a resource provider. For example, the first interaction data may comprise an interaction type, a time stamp, and a device identifier of an access device where the first authorization request message originated. For example, a vector of interaction data for a log-in authorization request may be [logInReq, 3 PM, laptop57832].

In step 404, the analytical model may analyze the first interaction data and determine a score for the first authorization request message. The first interaction data may be analyzed as described with reference to FIG. 5. The score determined by the analytical model may be a risk score, and may be an interaction label. The analytical model may also determine a classification for the first interaction as part of the interaction label. For example, the analytical model may classify the first interaction as fraudulent or not fraudulent. The classification may be based on the risk score. For example, the analytical model may determine a risk score of 70 for the first interaction, indicating that the first interaction is likely fraudulent. The analytical model may then determine a label of "fraud" for the first interaction. The classification may additionally, or alternatively, depend on a predicted authorization decision for the first interaction.

In step 406, the processing computer may append the score and/or interaction label to the first authorization request message. The processing computer may also include in the authorization request message information regarding how the score was determined. For example, the processing computer may include information about the analytical model and/or the interaction label. The processing computer may then transmit the first authorization request message comprising the score to an authorizing computer. The authorizing computer may use at least the first interaction data, the score, and other information in the first authorization request message to generate a first authorization response message. The authorizing computer may also generate a first indication indicating whether the first interaction is approved, denied, or whether some other action needs to be taken. The indication may be an authorization decision and/or reason code. The first authorization response message may comprise the first indication. The authorizing computer may have additional information related to the first interaction, the entities involved in the interaction, etc., and may use that additional information when generating the first indication.

In step 408, the authorizing computer may send the first authorization response message to the processing computer. The authorization response message may comprise the first indication that the first interaction is approved or declined. The first authorization response message may also include additional information, such as a request for additional information from the user. The processing computer may then receive the first authorization response message.

In step 410, the processing computer may transmit the first authorization response message to the access device. The access device may then present the first indication in the first authorization response message to the user. If the first authorization response message indicates that the user is authorized, the user may continue and/or finish the first interaction with the access device.

In step 412, the processing computer may extract authorization response data from the first authorization response message. For example, the authorization response data may comprise an authorization decision and a reason code, such as [approved, 00]. The processing computer may then input the authorization response data as authorization decision features and the analytical model may encode the authorization decision features. For example, the analytical model may encode the authorization decision features as [0, 00] where "0" represents an approved interaction as opposed to "1" for a declined transaction.

In step 414, the analytical model may be updated by the processing computer with the first authorization response message (as authorization decision features) and the first authorization request message (as interaction features) to form an updated analytical model. The authorization response data may be associated in the analytical model with the first interaction data. One or more LSTM cells of the analytical model may determine whether to add the authorization response data to cell states and hidden states.

In step 416, the updated analytical model may receive second interaction data, corresponding to a second authorization request message, as interaction features. The second authorization request message may have been received by the processing computer for a second interaction between the user and a resource provider. The resource provider may be the same resource provider as the first interaction or a different resource provider. Example second interaction data may comprise an interaction type, a timestamp, and a device identifier of an access device where the second authorization request originated. For example, a vector of interaction data for an a log-in authorization request may be [logInReq, 9 PM, mobile48207].

In step 418, the updated analytical model may analyze the second interaction data and determine a score for the second authorization request message. The second interaction data may be analyzed as described with reference to FIG. 5. In analyzing the second interaction, the updated analytical model may use the first interaction data and the first authorization response data. The score determined by the analytical model may be a risk score and may be an interaction label. The analytical model may also determine a classification for the second interaction as part of the interaction label. For example, the analytical model may classify the second interaction as fraudulent or not fraudulent. The classification may be based on the risk score. For example, the analytical model may determine a risk score of 15 for the second interaction, indicating that the second interaction is likely not fraudulent. The analytical model may then determine a label of "non-fraud" for the second interaction. The classification may additionally, or alternatively, depend on a predicted authorization decision for the second interaction.

Figure 7A:
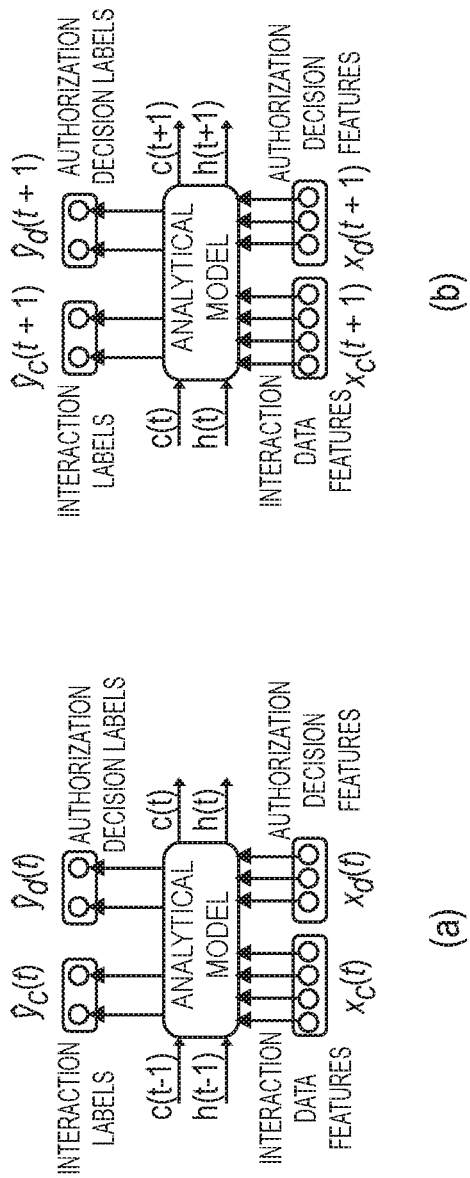
FIG. 7A and FIG. 7B show state diagrams of an analytical model according to embodiments.
Figure 7B:
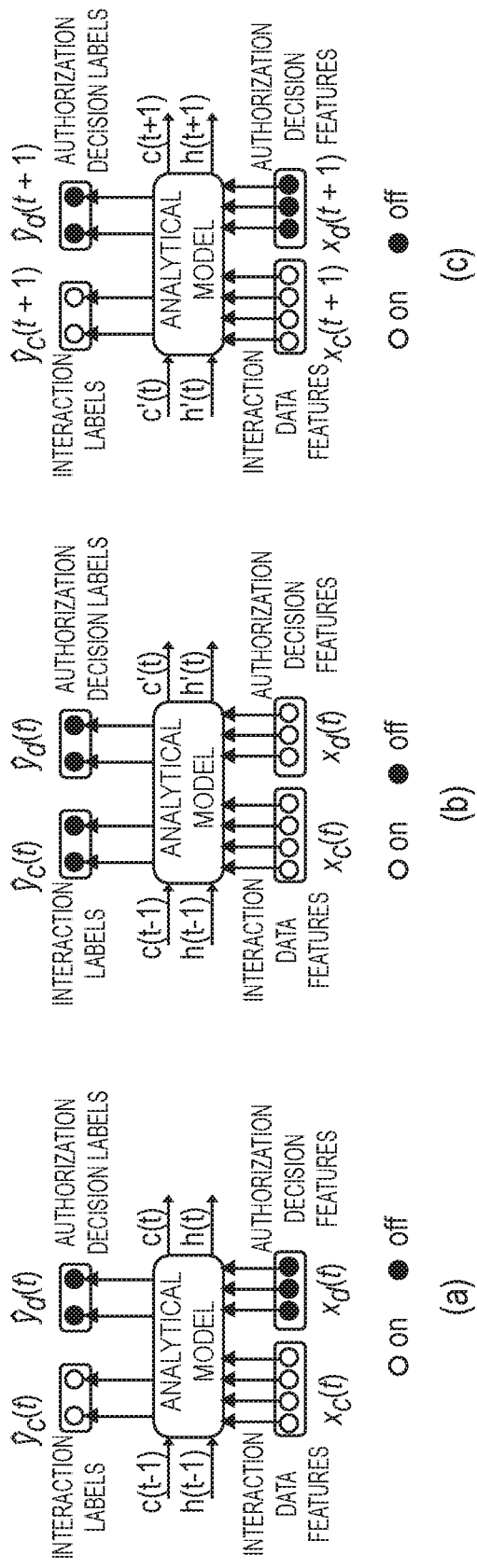

FIGS. 7A-B present state diagrams of an analytical model according to embodiments, in training and production. The analytical model may comprise at least one LSTM cell. At time t, one input $x_c(t)$ may be interaction data features such as interaction values, a timestamp, an interaction location, and an interaction type. For example, $x_c(t)$ may be the vector

[$20, 1 PM, Target, e-commerce]. Another input $x_d(t)$ may be authorization decision features based on authorization decisions, such as an approval or a decline and reason codes. For example, $x_d(t)$ may be the vector [declined, 05], where "05" is a particular reason code. One output $\hat{y}_c(t)$ may be an interaction label, which may include a risk score. For example, $\hat{y}_c(t)$ may be a vector [0.95, 0.05] with probabilities of an interaction being fraud and non-fraud, respectively. In some embodiments, there may be more than two potential interaction labels. Another output $\hat{y}_d(t)$ may be an authorization decision label, which may also be based on authorization decisions, like the authorization decision features. However, there may be more authorization decision features than authorization decision labels. The authorization decision label $\hat{y}_d(t)$ may be a prediction of an authorization decision from an authorizing computer. Some nodes in the analytical model may be specialized to receive particular features and to output particular labels. For example, some nodes may be for interaction data features $x_c(t)$. FIG. 7A-B depict an analytical model with one LSTM cell for purposes of illustration, but the principle holds for an analytical model with multiple LSTM cells, such as that shown in FIG. 5.

FIG. 7A shows the training stage where authorization decisions are available for training the model. In step (a), at time step t, training data comprising interaction data features $x_c(t)$ and authorization decision features $x_d(t)$ for an interaction may be input into the analytical model. A precursor cell state from the previous time step c(t−1) and a precursor hidden state from the previous time step h(t−1) may be updated in the LSTM to form a cell state c(t) and a hidden state h(t) for the current time step. The precursor cell state c(t−1) and the precursor hidden state h(t−1) may be updated by a method such as that described in FIG. 3. The analytical model may then output an interaction label $\hat{y}_c(t)$ and an authorization decision label $\hat{y}_d(t)$. For example, the interaction label $\hat{y}_c(t)$ may be a security risk score and the authorization decision label $\hat{y}_d(t)$ may be a decline response code. The output interaction label $\hat{y}_c(t)$ may be compared to an actual interaction label in the training data and the authorization decision label $\hat{y}_d(t)$ scores may be compared to an actual authorization decision label in the training data. Based on the comparison, the classification loss of the analytical model can be computed. The analytical model, in particular the weights in the analytical model, may be modified to decrease the classification loss.

In step (b), at time step t+1, interaction data features $x_c(t+1)$ and authorization decision features $x_{d(t+1)}$ for another interaction may be input into the analytical model. The cell state from the previous time step c(t) and the hidden state from the previous time step h(t) may be updated in the LSTM to form an updated cell state c(t+1) and an updated hidden state h(t+1) for the current time step. The analytical model may then output an interaction label $\hat{y}_c(t+1)$ and authorization decision label $\hat{y}_d(t+1)$. This process may repeat for each interaction in the training data until all interactions have been processed and the classification loss is minimized.

FIG. 7B shows the production stage where authorization decisions are not available at runtime. In step (a), at time step t, the analytical model may analyze an interaction from a user. Interaction data features $x_c(t)$ may be input into the analytical model. Authorization decision features $x_d(t)$ may not be available because an authorization response message may not have been received from an authorizing computer, so the nodes associated with authorization decision features $x_d(t)$ may be turned off or inactive. A precursor cell state from the previous time step c(t−1) and a precursor hidden state from the previous time step h(t−1) may be updated with information from the interaction data features $x_c(t)$ in the LSTM to form a cell state c(t) and a hidden state h(t) for the current time step. The analytical model may then determine an interaction label $\hat{y}_c(t)$. For example, the analytical model may determine a security risk score for the interaction. The analytical model may not need to predict the authorization decision that will be received from the authorizing computer beyond the information in the interaction label $\hat{y}_c(t)$, so the analytical model may not determine an authorization decision label $\hat{y}_d(t)$. Thus the nodes for the authorization decision label $\hat{y}_d(t)$ may be turned off or inactive. The interaction label $\hat{y}_c(t)$ can be transmitted to the authorizing computer as a part of the authorization request message. The authorizing computer can analyze the interaction and return an authorization response message with an authorization decision.

In step (b), upon receiving the authorization decision, authorization decision features $x_d(t)$ can be generated based on the authorization decision. The nodes in the analytical model for the authorization decision features $x_d(t)$ can be turned on. The interaction data features $x_c(t)$ and authorization decision features $x_d(t)$ may then be input into the analytical model together. The analytical model can again update the precursor cell state c(t−1) and the precursor hidden state vector h(t−1) with the new information to form a modified cell state c'(t) and modified hidden state h'(t). The modified cell state c'(t) and the modified hidden state h'(t) can replace the cell state c(t) and the hidden state h(t) from step (a). Subsequent interactions from the user may be analyzed using the modified cell state c'(t) and the modified hidden state h'(t). The interaction label $\hat{y}_c(t)$ may not be determined again because the interaction of time t has already been analyzed. The authorization decision label $\hat{y}_d(t)$ may not be determined because the authorization decision has already been received from the authorizing computer. Therefore the nodes for the interaction label $\hat{y}_c(t)$, along with the nodes for the authorization decision label $\hat{y}_d(t)$, can be turned off or inactive.

In step (c), at time step t+1, a new interaction from the user can be analyzed. Interaction data features $x_c(t+1)$ may be input into the analytical model. The nodes for authorization decision features $x_d(t+1)$ may be turned off again, since an authorization decision for the new interaction may not have been received yet. The modified cell state c'(t) and the modified hidden state h'(t) may be updated in the LSTM to form an updated cell state c(t+1) and an updated hidden state h(t+1) for the current time step. By using the modified cell state c'(t) and the modified hidden state h'(t), the analytical model can use information from the authorization decision of the previous interaction when analyzing the new interaction. The analytical model may then determine an interaction label $\hat{y}_c(t+1)$. The analytical model may not need to predict the authorization decision that will be received from the authorizing computer beyond the information in the interaction label $\hat{y}_c(t)$, so the analytical model may not determine an authorization decision label $\hat{y}_d(t+1)$. Thus the nodes for the authorization decision label $\hat{y}_d(t+1)$ may be turned off or inactive. This process of analyzing an interaction and updating the analytical model may repeat for each new interaction from the user.

Figure 8:
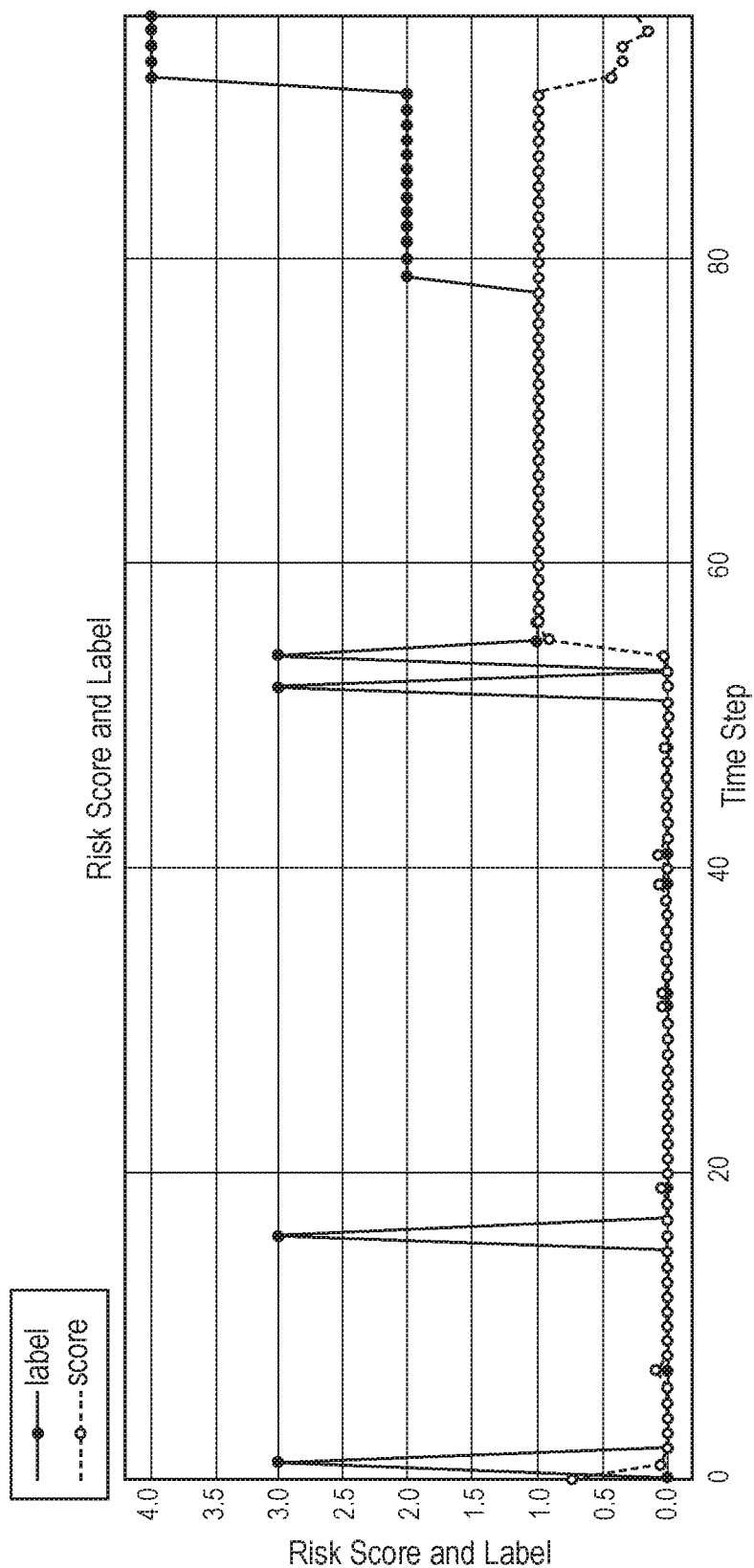
FIG. 8 shows a graph of data for risk scores and labels over time for an example implementation according to embodiments.

FIG. 8 shows a graph of interaction labels, in particular a risk score and a risk label, over time for a single user. The graph shows example risk labels (e.g., interaction labels and authorization decision labels) that may be used in embodiments, as well as how a risk label and a risk score may be related. Each time step represents an interaction. The risk label may take on integer values, each representing a different label. For example, risk labels may include "0" for a legitimate interaction, "1" for a fraudulent interaction, "2" for a declined interaction with a reason code "05" (do not honor), "3" for address verification, and "4" for a declined interaction with a type different from the reason code "05" (e.g., referral, pick up card). Note that the risk labels may be related to authorization decisions (e.g., reason codes). The risk score may take on values between 0 and 1, with 0 representing an interaction that is likely not fraudulent and/or with minimal risk, and 1 representing an interaction that is high risk and/or likely fraudulent. When there is a fraudulent interaction, that may be represented by both the risk label and the risk score. Some risk labels do not have a corresponding change in risk score. After there is a fraudulent interaction, the risk score may stay high and subsequent interactions may be classified as fraudulent. Eventually, the risk score may begin to decrease.

Figure 9:
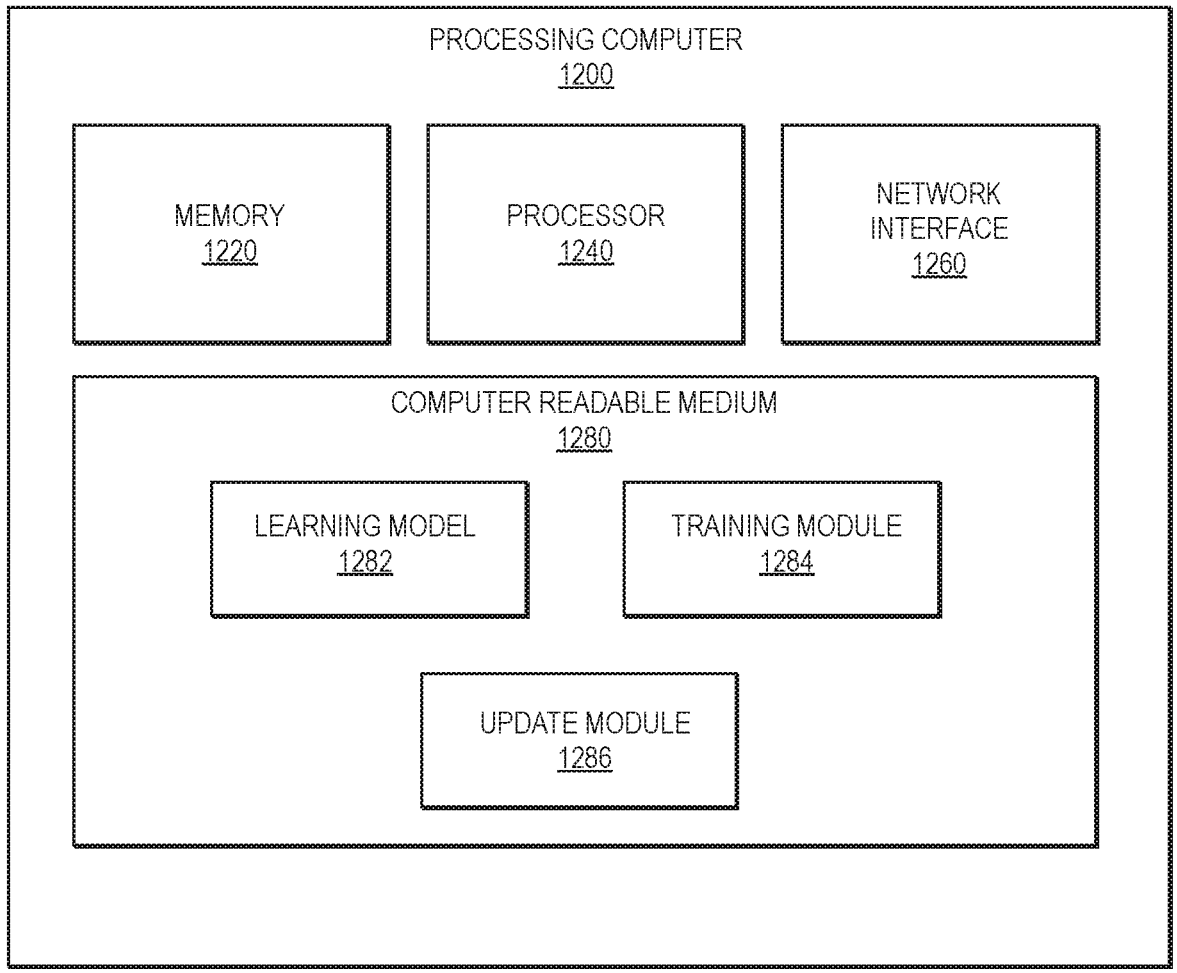
FIG. 9 shows a block diagram of a processing computer according to embodiments.

FIG. 9 shows a block diagram of a processing computer 1200 that may be used in embodiments of the invention. Processing computer 1200 may be for example, processing computer 104 of FIG. 1. Processing computer 1200 may comprise a memory 1220, a processor 1240, and a network interface 1260. The processing computer 1200 may also comprise a computer readable medium 1280, which may comprise code, executable by the processor 1240, for implementing methods according to embodiments. The computer readable medium 1280 may contain a learning model 1282, a training module 1284, and an update module 1286.

The memory 1220 may be implemented using any combination of any number of non-volatile memories (e.g., flash memory) and volatile memories (e.g., DRAM, SRAM), or any other non-transitory storage medium, or a combination of media.

The network interface 1260 may be configured to connect to one or more communication networks to allow the processing computer 1200 to communicate with other entities such as access device 102 and authorizing computer 106 of FIG. 1. For example, communication with the access device 102 can be direct, indirect, and/or via an API.

The processor 1240 may be implemented as one or more integrated circuits (e.g., one or more single core or multicore microprocessors and/or microcontrollers). The processor 1240 may be used to control the operation of the processing computer 1200. The processor 1240 can execute a variety of programs in response to program code or computer-readable code stored in memory 1220. The processor 1240 may include functionality to maintain multiple concurrently executing programs or processes.

The computer readable medium 1280 may comprise one or more non-transitory media for storage and/or transmission. Suitable media include, as examples, a random access memory (RAM), a read only memory (ROM), a magnetic medium such as a hard-drive, or an optical medium such as a compact disk (CD) or DVD (digital versatile disk), flash memory, and the like. The computer readable medium 1280 may be any combination of such storage or transmission devices.

The learning model 1282 may be a deep recurrent neural network. The learning model 1282 may comprise at least one long short-term memory. The learning model 1282, in conjunction with the processor 1240, may receive data including interaction data from authorization request messages and authorization decisions from authorization request messages and may determine an interaction label based on the data. The interaction label may be, for example, a risk score. The learning model 1282, in conjunction with the processor 1240, may determine a risk score for an interaction which may be used by an authorizing entity when authorizing the interaction. During training of the learning model 1282, the learning model 1282 may receive training data from the training module 1284.

The training module 1284, in conjunction with the processor 1240, may train the learning model 1282. The training module 1284 may receive historical data including interaction data from prior authorization request messages and authorization decisions from prior authorization request messages. The training module 1284, in conjunction with the processor 1240, may collect interaction data and authorization decisions to create a training dataset.

The update module 1286, in conjunction with the processor 1240, may update the learning model 1282 between interactions. The update module 1286 may receive authorization response messages and/or authorization decisions from authorization response messages. The update module 1286, in conjunction with the processor 1240, may associate an authorization decision with the interaction data from the related authorization request message. The update module 1286, in conjunction with the processor 1240, may then input the authorization decision and the associated interaction data into the learning model 1282 to update it with the new information.

The computer readable medium 1280 may comprise code, executable by the processor 1240, for implementing a method including receiving, from an access device, an authorization request message for an interaction between a user and a resource provider. The method then includes determining, by an analytical model comprising a neural network with at least one long short-term memory, a score based upon data in the authorization request message, wherein the analytical model was formed using interaction data from prior authorization request messages, and authorization response messages from an authorizing computer. Then the method includes transmitting, to the authorizing computer, the authorization request message comprising the score and receiving an authorization response message from the authorizing computer, the authorization response message including an indication of whether the interaction was approved or declined. Then the method includes transmitting the second authorization response message to the access device and updating the analytical model based upon data in the authorization request message and the indication in the authorization response message to form an updated analytical model.

Embodiments of the invention use an analytical architecture drastically different from traditional risk detection approaches. Interaction histories may be read, written and updated on the fly, with small memory footprint. An LSTM can easily store and access relevant authorization data, instead of attempting to store authorization data from millions of interactions and users. This can effectively obviate the need of storing a user's historical interactions, which can reduce the data storage and computational resource required. Embodiments can also generate a risk score in real time (~8 milliseconds). The resulting analytical model may have the capability of self-discovery of interpretable and predictive patterns, through learning the internal cell states and hidden states of the analytical model. Embodiments may offer significant performance improvement over existing risk models. For instance, at 1% interaction review rate, embodiments of the invention achieve a 41.52% improvement in fraud catch rate and a 62.20% improvement in false-decline rate over a state-of-the-art deep neural network used in the payment industry.

Incorporating authorization decisions into a risk model poses both analytical and implemental challenges, but it also presents opportunities for potential breakthrough. Embedding authorization decisions into the inner structure of a neural network analytical model can enhance a risk score in real time. Embodiments may represent a new paradigm for building high-performance risk models. Because of the superior performance, embodiments may be readily deployed in production.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a processing computer from an access device, an authorization request message for an interaction between a user and a resource provider;
   determining, by an analytical model comprising a neural network with at least one long short-term memory on the processing computer, a score based upon data in the authorization request message, wherein the analytical model was formed using interaction data from prior authorization request messages, and authorization response messages from an authorizing computer;
   transmitting, by the processing computer to the authorizing computer, the authorization request message comprising the score;
   receiving, by the processing computer, an authorization response message from the authorizing computer, the authorization response message including an indication of whether the interaction was approved or declined;
   transmitting, by the processing computer, the authorization response message to the access device; and
   updating the analytical model based upon data in the authorization request message and the indication in the authorization response message to form an updated analytical model.

2. The method of claim 1, wherein the authorization request message is a second authorization request message, the interaction is a second interaction, the score is a second score, the authorization response message is a second authorization response message and wherein the method further comprises:
   receiving, by the processing computer, a first authorization request message from an access device for a first interaction between the user and a resource provider;
   determining, by a precursor analytical model comprising a neural network with at least one long short-term memory on the processing computer, a first score based upon data in the first authorization request message;
   transmitting, by the processing computer to the authorizing computer, the first authorization request message comprising the first score;
   receiving, by the processing computer, a first authorization response message from the authorizing computer, the first authorization response message including an indication of whether the first interaction was approved or declined;
   transmitting, by the processing computer, the first authorization response message to the access device; and
   updating the precursor analytical model based upon data in the first authorization request message and the indication in the first authorization response message to form the analytical model.

3. The method of claim 2, wherein updating the precursor analytical model to form the analytical model occurs before the second authorization request message is received by the processing computer.

4. The method of claim 1, wherein the indication in the authorization response message comprises an approval.

5. The method of claim 1, wherein determining the score further comprises determining a label based on the score.

6. The method of claim 1, wherein the score is a security risk score.

7. The method of claim 1, wherein the analytical model comprises more than one long short-term memory.

8. The method of claim 1, wherein the authorization request message transmitted by the processing computer further comprises information regarding how the score was determined.

9. The method of claim 1, wherein the long short-term memory comprises a cell state and a hidden state for each of a plurality of users, the plurality of users including the user.

10. A processing computer comprising:
    a processor; and
    a computer readable medium, coupled to the processor, for performing a method comprising:
      receiving, from an access device, an authorization request message for an interaction between a user and a resource provider;
      determining, by an analytical model comprising a neural network with at least one long short-term memory, a score based upon data in the authorization request message, wherein the analytical model was formed using interaction data from prior authorization request messages, and authorization response messages from an authorizing computer;
      transmitting, to the authorizing computer, the authorization request message comprising the score;
      receiving an authorization response message from the authorizing computer, the authorization response message including an indication of whether the interaction was approved or declined;
      transmitting the second authorization response message to the access device; and updating the analytical model based upon data in the authorization request message and the indication in the authorization response message to form an updated analytical model.

11. The processing computer of claim 10, wherein the authorization request message is a second authorization request message, the interaction is a second interaction, the score is a second score, the authorization response message is a second authorization response message and wherein the method further comprises:
receiving a first authorization request message from an access device for a first interaction between the user and a resource provider;
determining, by a precursor analytical model comprising a neural network with at least one long short-term memory, a first score based upon data in the first authorization request message;
transmitting, to an authorizing computer, the first authorization request message comprising the first score;
receiving a first authorization response message from the authorizing computer, the first authorization response message including an indication of whether the first interaction was approved or declined;
transmitting the first authorization response message to the access device; and
updating the precursor analytical model based upon data in the authorization response message and the indication in the authorization request message to form the analytical model.

12. The processing computer of claim 11, wherein updating the precursor analytical model to form the analytical model occurs before the second authorization request message is received by the processing computer.

13. The processing computer of claim 10, wherein the indication in the authorization response message comprises an approval.

14. The processing computer of claim 10, wherein determining the score further comprises determining a label based on the score.

15. The processing computer of claim 10, wherein the score is a security risk score.

16. The processing computer of claim 10, wherein the analytical model comprises more than one long short-term memory.

17. The processing computer of claim 10, wherein the authorization request message transmitted by the processing computer further comprises information regarding how the score was determined.

18. The processing computer of claim 10, wherein the long short-term memory comprises a cell state and a hidden state for each of a plurality of users, the plurality of users including the user.

19. A method comprising:
generating, by an access device, an authorization request message comprising data associated with an interaction between a user and a resource provider;
transmitting the authorization request message to a processing computer; and
receiving an authorization response message from the processing computer, wherein the authorization response message was generated based on at least a score from an analytical model in the processing computer, wherein the analytical model comprises a neural network with at least one long-short term memory and wherein the analytical model was formed using interaction data from prior authorization request messages, and authorization response messages from an authorizing computer.

20. The method of claim 19, wherein the authorization request message is transmitted to the processing computer via a transport computer.

* * * * *